United States Patent [19]

Ritter, deceased

[11] Patent Number: 4,663,510
[45] Date of Patent: May 5, 1987

[54] METHOD FOR ASSEMBLING A NUCLEAR REACTOR FUEL ELEMENT

[75] Inventor: Harry Ritter, deceased, late of Hanau, Fed. Rep. of Germany, by Erika Ritter, heir

[73] Assignee: Reaktor-Brennelement Union GmbH, Hanau, Fed. Rep. of Germany

[21] Appl. No.: 665,292

[22] Filed: Oct. 26, 1984

[30] Foreign Application Priority Data

Oct. 28, 1983 [DE] Fed. Rep. of Germany ....... 3339241

[51] Int. Cl.⁴ ............................................. B23K 11/00
[52] U.S. Cl. ................. 219/86.1; 219/78.01; 219/91.2
[58] Field of Search ............. 219/86.1, 91.2, 117.1, 219/118, 61, 67, 78.01, 160; 376/434

[56] References Cited

U.S. PATENT DOCUMENTS

| | | | |
|---|---|---|---|
| 2,057,017 | 10/1936 | De Ganahl | 219/86.1 |
| 4,048,463 | 9/1977 | Bennett et al. | 219/118 |
| 4,124,443 | 11/1978 | Bezold | 376/434 |
| 4,239,953 | 12/1960 | Bock | 219/79 |
| 4,450,338 | 5/1984 | Conn | 219/160 X |

FOREIGN PATENT DOCUMENTS 0082075 6/1983 European Pat. Off. .
2411469 12/1977 France .

OTHER PUBLICATIONS

Patent Abstracts of Japan, vol. 7, No. 44, (M-195), (1189), Feb. 22, 1983, of Japan-A, No. 57 193 207, (11/27/82).

*Primary Examiner*—E. A. Goldberg
*Assistant Examiner*—C. M. Sigda
*Attorney, Agent, or Firm*—Herbert L. Lerner; Laurence A. Greenberg

[57] ABSTRACT

A method for assembling a nuclear reactor fuel element including a head part, a base part and grid-shaped spacer parts for accommodating fuel rods containing nuclear fuel and for accommodating control rod guide tubes having holding bodies for at least one of the head, base and spacer parts at given welding spots, includes threading the control rod guide tubes into the spacers, subsequently inserting a rod with support reinforcements into the control guide tube with one of the support reinforcements located at least at each respective given welding spot, and subsequently pressing and resistance spot welding the holding bodies against the outside of the control rod guide tube at the welding spots with welding electrodes of electric welding tongs.

2 Claims, 7 Drawing Figures

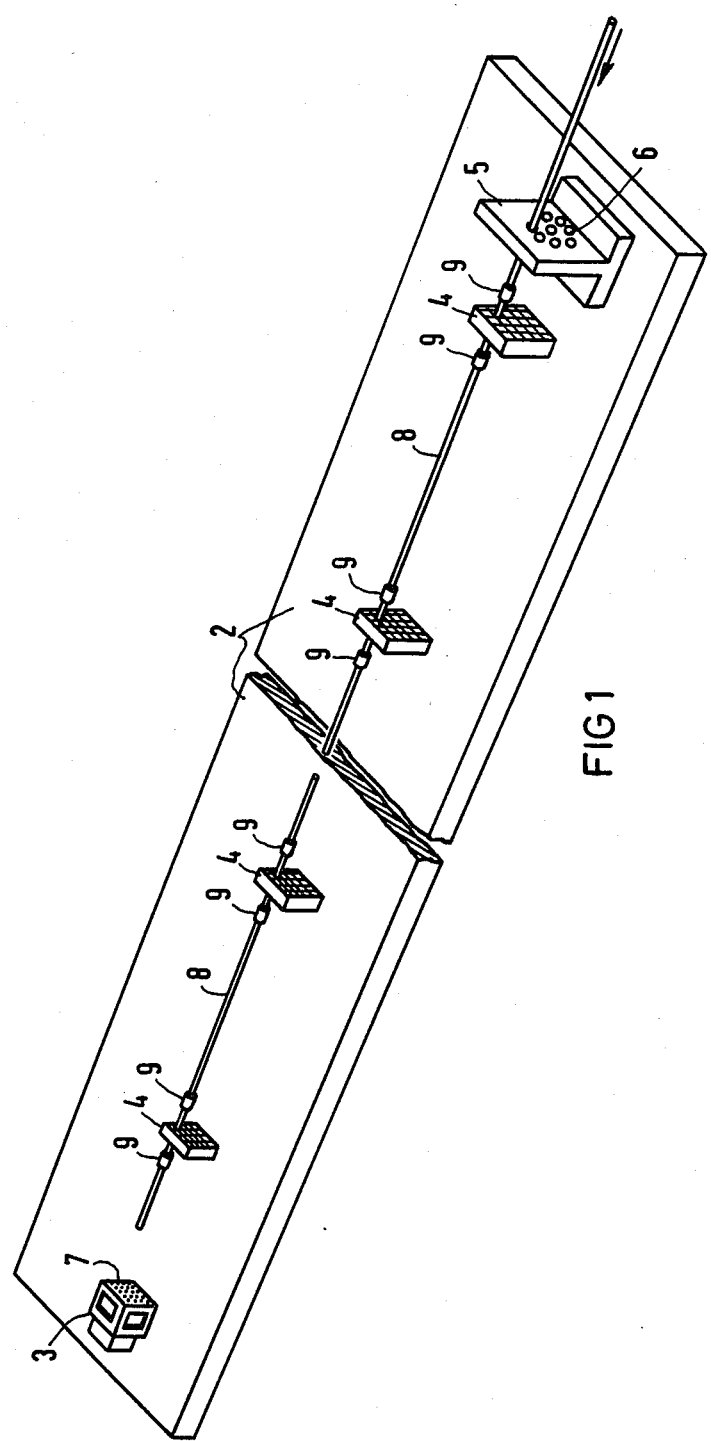

METHOD FOR ASSEMBLING A NUCLEAR REACTOR FUEL ELEMENT

The invention relates to a method for assembling a nuclear reactor fuel element which includes a head part, a base part and grid-like spacers, for fuel rods containing nuclear fuel and for control rod guide tubes, the control rod guide tubes being threaded in a first operation into the spacers and the outside of the control rod guide tubes being provided in a subsequent second operation with holding bodies, especially holding bushings, for the spacers and/or head and base parts at welding points, by resistance spot welding.

In such a nuclear reactor fuel element, the control rod guide tubes are guided in a square grid mesh through several square grid-shaped spacers which as a rule are disposed at the same distance from each other in the direction along the longitudinal axis of the control rod guide tubes and therefore also along the longitudinal axis of the fuel element. The control rod guide tubes are aligned with each other, with the head plate of the head part and with the base plate of the base part of the nuclear reactor fuel element. The head and base parts form the so-called skeleton of the nuclear reactor fuel element together with the control rod guide tubes and the spacers. Fuel rods which contain nuclear fuel in hermetically sealed cladding tubes are brought through the square grid meshes of the spacer which are not occupied by the fuel rod guide tubes. The control rod guide tubes are bolted to the head plate of the head part and directly to the base plate of the base part of the nuclear reactor fuel element by a holding sleeve disposed on the outside of the tube end, and the guide tubes act as holding tubes for the spacer due to holding sleeves which are welded on at the outside. However, the fuel rods are fastened neither to the head plate of the head part nor to the base plate of the base part, but they instead have play between the head and base plate and can therefore expand freely in the direction of their longitudinal axes, i.e. in the longitudinal direction of the nuclear reactor fuel element. These fuel rods are held frictionally by spring elements which are located in the respective mesh openings of the spacers.

It is already common practice to use a fixed or spreading electrode for welding the holding sleeves for the spacers as well as for the head part, to a control rod guide tube threaded into the spacers during the assembly of a nuclear reactor fuel element, on the inside of the control rod guide tube. The fixed or spreading electrode is located at the end of a rod. It is also common to move the electrode from one welding spot to the next with the rod. Since this procedure is very time-consuming because the individual welding spot must be hit exactly with the fixed or the spreading electrode, it is accordingly an object of the invention to provide a method for assembling a nuclear reactor fuel assembly, which overcomes the hereinafore-mentioned disadvantages of the heretoforeknown methods of this general type, and to do so in such a way that the time required for welding on the holding sleeves to the control rod guide tubes is reduced considerably.

With the foregoing and other objects in view there is provided, in accordance with the invention, a method for assembling a nuclear reactor fuel element including a head part, a base part and grid-shaped spacer parts for accomodating fuel rods containing nuclear fuel and for accomodating control rod guide tubes having holding bodies or sleeves for at least one of the head, base and spacer parts at given welding spots, which comprises threading the control rod guide tubes into the spacers, subsequently inserting a rod with support reinforcements into the control rod guide tube with one of the support reinforcements located at least at each respective given welding spot, and subsequently pressing and resistance spot welding the holding bodies against the outside of the control rod guide tube at the welding spots with two welding electrodes of electric welding tongs.

The support reinforcements can be distributed on the outside of the rod in such a manner that they are located exactly at the intended welding spots for the holding bodies, if the rod, provided with the support reinforcements, comes to a stop at a stop body on the outside of and at the end of the control rod guide tube, into which it has been inserted. After the holding bodies are suitably positioned on the outside of the control rod guide tube, these holding bodies can be welded by electric welding tongs to the outside of the control rod guide tube. In this case, the support reinforcements prevent the control rod guide tube and also the holding bodies at the welded spots from being deformed by the welding tongs. The holding bodies may be holding sleeves on the outside of the control rod guide tube for the spacer or if they are at one end of the control rod guide tube they may be provided with an internal thread for the head or base part of the nuclear reactor fuel element. In the latter case, the head and base parts are bolted to the holding sleeve. The holding bodies, however, may also be holding tabs which are formed at the spacers.

In accordance with a concomitant mode of the invention, there is provided a method wherein the rod is a tube having at least one radial hole formed through the rod and through one of the support reinforcements, which comprises blowing a gas, preferably air, through the rod and the radial hole into the control rod guide tube when inserting the rod into or withdrawing the rod from the control rod guide tube. In this way, a sort of air cushion is formed in the control rod guide tube between the support reinforcements and the inside wall of the control rod guide tube, so that these support reinforcements cannot tilt against the inside wall of the control rod guide tube, either when inserting or when withdrawing the rod, i.e. they cannot jam on the control rod guide tube.

Other features which are considered as characteristic for the invention are set forth in the appended claims.

Although the invention is illustrated and described herein as embodied in a method for assembling a nuclear reactor fuel element, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 is a fragmentary, diagrammatic, perspective view of an assembly bench for a nuclear reactor fuel element;

FIG. 2 is a side-elevational view of a rod with support reinforcements for insertion into a control rod guide tube of a nuclear reactor fuel element shown in FIG. 1;

Figure 3:
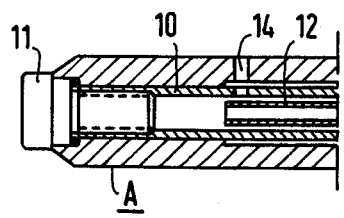
FIG. 3 is an enlarged longitudinal sectional view of an end body A at the end of the rod according to FIG. 2, which is inserted into the control rod guide tube.
Figure 4:
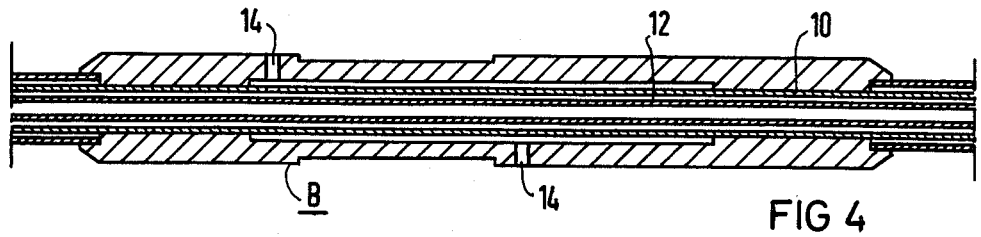
FIG. 4 is an enlarged longitudinal sectional view of one of the support reinforcements B on the outside of the rod according to FIG. 2.
Figure 5:
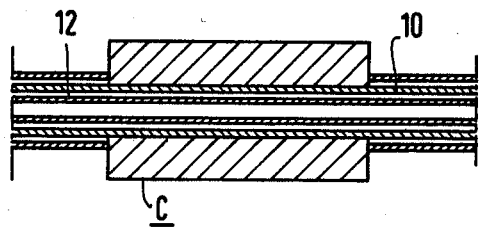
FIG. 5 is an enlarged longitudinal sectional view of a stop body C at the other end of the rod according to FIG. 2, which is not inserted into the control rod guide tube.
Figure 6:
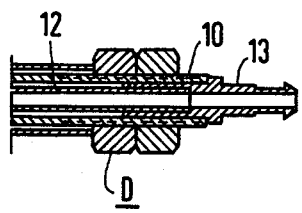
FIG. 6 is another enlarged longitudinal sectional view of a connecting part D for a compressed-air hose, at the same end of the rod according to FIG. 2 at which the stop body C is located.

Referring now to the figures of the drawings in detail and first particularly to FIG. 1 thereof, there is seen an assembly bench 2 on which a base part 3 for a nuclear reactor fuel element and several grid-shaped spacers 4 for the nuclear rector fuel element are positioned in mutual alignment and at distances from each other which are provided in the nuclear reactor fuel element. A template 5 is disposed at the end of the assembly bench 2 opposite the end with the base part 3. The template 5 is fixed in place and has holes 6 which are aligned exactly with the mesh openings of the spacers 4 and holes in a base plate 7 of the base part 3, which are intended for the control rod guide tubes of the nuclear reactor fuel element to be assembled.

FIG. 1 also shows such a control rod guide tube 8 which is open at least at one end of the tube and which is being threaded through the template 5 and the spacer 4. Holding sleeves 9 are mounted on both sides of the spacer 4 on the outside of the control rod guide tube 8. After the control rod guide tube 8 is screwed to the base plate 7 of the base part 3, the holding sleeves 9 can be welded firmly to the control rod guide tube 8, resting against the spacers 4.

To this end, a rod 10 shown in FIG. 2 is inserted into the control rod guide tube 8 at the end thereof disposed at the template 5. The rod 10 is in the form of a tube. The rod 10 has a cylindrical support reinforcement A coaxial with the rod 10 at the end thereof located in the control rod guide tube 8, and the rod 10 has a stop body C which is cylindrical and coaxial with the rod 10 at the other end, on the outside of the rod. The outside diameter of the stop body C is larger than the inside diameter of the control rod guide tube 8. Cylindrical support reinforcements B are disposed on the outside of the tubular rod 10 between the support reinforcement A and the stop body C, at a spacing from each other and at a spacing from the support reinforcement A, and the stop body C. Like the support reinforcement A, the cylindrical support reinforcements B have an outside diameter which is somewhat smaller than the inside diameter of the control rod guide tube 8. When the rod 10 is inserted into the control rod guide tube 8 up to the stop body C, the reinforcements B are located exactly at or under the points of the control rod guide tube 8 at which the holding sleeves 9 can be welded on at both sides of the spacers 4.

As FIGS. 3 to 6 show, the tubular rod 10 is hermetically sealed by an end plug 11 at the end having the support reinforcement A. Furthermore, an inner tube 12 with an outside diameter which is smaller than the inside diameter of the tubular rod 10, is coaxially disposed in the rod. This inner tube 12 is guided at the end of the tubular rod 10 at which the stop body C is located by bringing it through a plug 13 without play. In this way, the tubular rod 10 is hermetically sealed at the end thereof having the stop body C. At the end having the stop body, the rod 10 forms a connecting part D for a compressed air hose which feeds compressed air into the inner tube 12. The tube 12 is open at both ends thereof and extends to the support reinforcement A, but is spaced from the end plug 11.

The support reinforcements A and B have three respective radial holes 14 formed therein, which are open at both ends, which also extend through the wall of the tubular rod 10 and which open into the interior of the tubular rod 10.

After the operation of threading the control rod guide tube 8 through the template 5 and the holding sleeves 9, and after bolting the control rod guide tube 8 firmly to the base plate 7 of the base part 3, compressed air from a non-illustrated compressed air hose slipped onto the inner tube 12, is admitted through the inner tube 12 into the tubular rod 10, and is brought out again through the radial holes 14. The tubular rod 10 through which the compressed air flows, is then inserted into the control rod guide tube 8 at the open end of the tube having the template 5, up to the stop body C. During this process, the support reinforcements A and B slide on an air cushion formed by the compressed air, in the control rod guide tube 8. These support reinforcements A and B therefore cannot jam on the inside of the control rod guide tube 8 when the tubular rod 10 is inserted.

Figure 7:
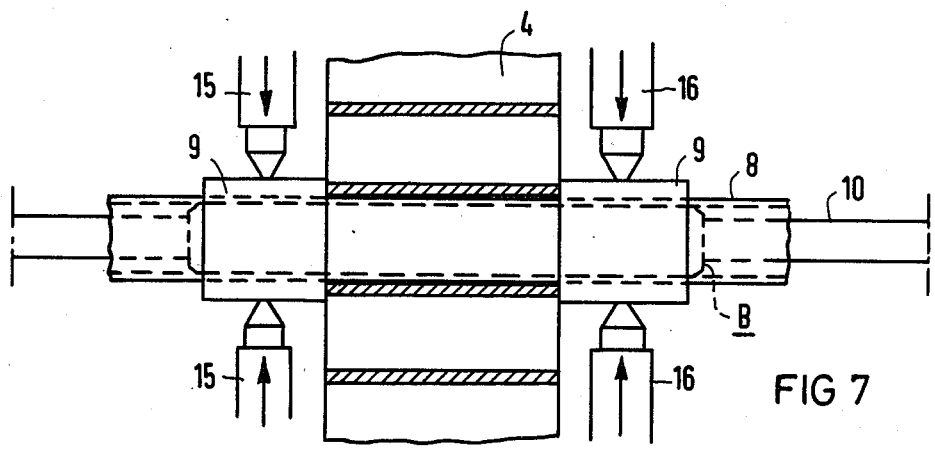
FIG. 7 is an enlarged side-elevational view of a control rod guide tube in a spacer on the assembly bench according to FIG. 1.

After the tubular rod 10 is introduced into the control rod guide tube 8 up to the stop body C, the compressed air is turned off. Thereupon, the holding sleeves 9 are resistance spot welded on both sides of the spacers 4 on the outside of the control rod guide tube 8, by means of welding electrodes 15 and 16 of welding tongs which can be seen in FIG. 7. The support reinforcement B outside the tubular rod 10 in the control rod guide tube 8 which is indicated by broken lines in FIG. 7, prevents deformation of the holding sleeves 9 and the control rod guide tube 8 when welding the holding sleeves 9 with the welding electrodes 15 and 16 on the electric welding tongs between two welding electrodes 15 and 16 and due to the pressure exerted on the control rod guide tube 8. After the completion of this welding operation, the compressed air is switched on again and an air cushion for the support reinforcements A and B of the tubular rod 10 is formed in the control rod guide tube 8. The rod 10 can then be withdrawn again from the control rod guide tube 8 without danger of jamming the support reinforcements A and B in the control rod guide tube 8.

After all of the control rod guide tubes specified by the holes 6 in the template 5 are threaded into the spacers 4 on the assembly bench 2 and these control guide tubes are screwed to the base plate 7 of the base part 3, the template 5 can be removed from the assembly bench 2. Then, fuel rods filled with nuclear fuel can be threaded into the mesh openings of the spacers 4 which are not occupied by control rod guide tubes. Subsequently, the head plate of a non-illustrated head part of the nuclear reactor fuel element is tightly screwed with an internal thread, for instance, at the end of the control rod guide tube 8 at which the template was located, to a non-illustrated holding sleeve which is welded on the outside of the tube end. In the nuclear reactor fuel element which is now completely assembled, the fuel rods which have been threaded into the spacers 4 and are likewise not shown, are spaced from the base plate of the base part as well as from the head plate of the head part.

The foregoing is a description corresponding in substance to German Application P No. 33 39 241.2, filed Oct. 28, 1983, the International priority of which is being claimed for the instant application, and which is hereby made part of this application. Any material discrepancies between the foregoing specification and the aforementioned corresponding German application are to be resolved in favor of the latter.

It is claimed:

1. Method for assembling a nuclear reactor fuel element including a head part, a base part and a plurality of grid-shaped space parts for accomodating fuel rods containing nuclear fuel and for accomodating control rod guide tubes having holding bodies for at least one of the head, base and spacer parts at given intended welding spots, which comprises threading a plurality of control rod guide tubes having holding bodies and ends into the spacer parts, subsequently inserting a respective one of a plurality of other rods in the form of tubes each having a stop body, a plurality of support reinforcements and at least one radial hole formed through the other rod and through one of the support reinforcements, into each respective control rod guide tube in a given insertion direction with the reinforcements downstream of the stop bodies as seen in the given insertion direction, until the stop bodies come to a stop against the ends of the control rod guide tubes and a respective one of the support reinforcements is located exactly at each respective given intended welding spot, blowing a gas through each other rod and each radial hole into a respective control rod guide tube when inserting the other rod into the control rod guide tube, and subsequently pressing and resistance spot welding the holding bodies against the outside of the control rod guide tubes at the welding spots with welding electrodes of electric welding tongs.

2. Method for assembling a nuclear reactor fuel element including a head part, a base part and a plurality of grid-shaped spacer parts for accomodating fuel rods containing nuclear fuel and for accomodating control rod guide tubes having holding bodies for at least one of the head, base and spacer parts at given intended welding spots, which comprises threading a plurality of control rod guide tubes having holding bodies and ends into the spacer parts, subsequently inserting a respective one of a plurality of other rods in the form of tubes each having a stop body, a plurality of support reinforcements and at least one radial hole formed through the other rod and through one of the support reinforcements, into each respective control rod guide tube in a given insertion direction with the reinforcements downstream of the stop bodies as seen in the given insertion direction, until the stop bodies come to a stop against the ends of the control rod guide tubes and a respective one of the support reinforcements is located exactly at each respective given intended welding spot, blowing a gas through each other rod and each radial hole into a respective control rod guide tube when withdrawing the other rod from the control rod guide tube, and subsequently pressing and resistance spot welding the holding bodies against the outside of the control rod guide tubes at the welding spots with welding electrodes of electric welding tongs.

* * * * *